United States Patent
Green et al.

(10) Patent No.: US 6,245,847 B1
(45) Date of Patent: Jun. 12, 2001

(54) ELECTROLYTE

(75) Inventors: Kevin John Green; James Charles Wilson, both of Gosport (GB)

(73) Assignee: The Secretary of State for Defence in Her Britannic Majesty's Government of the United Kingdom of Great Britain and Northern Ireland, Hampshire (GB)

( * ) Notice: Subject to any disclaimer, the term of this patent is extended or adjusted under 35 U.S.C. 154(b) by 0 days.

(21) Appl. No.: 09/254,630

(22) PCT Filed: Sep. 11, 1997

(86) PCT No.: PCT/GB97/02443

§ 371 Date: Apr. 6, 1999

§ 102(e) Date: Apr. 6, 1999

(87) PCT Pub. No.: WO98/11619

PCT Pub. Date: Mar. 19, 1998

(30) Foreign Application Priority Data

Sep. 13, 1996 (GB) .................................. 9619133

(51) Int. Cl.[7] .................. C08J 3/00; C08K 3/30; C08K 3/10; C08L 33/00; H01M 6/18
(52) U.S. Cl. .................. 524/418; 204/194; 204/410; 359/265; 359/270; 361/500; 361/523; 361/527; 429/303; 429/304; 429/307; 524/99; 524/104; 524/408
(58) Field of Search .................. 429/192, 303, 429/304, 307; 524/99, 104, 408, 418; 204/194, 410; 361/500, 523, 527; 359/265, 270

(56) References Cited

U.S. PATENT DOCUMENTS

| 5,484,670 | 1/1996 | Angell et al. |
| 5,643,490 | 7/1997 | Takahashi . |
| 5,693,432 | * 12/1997 | Matsumoto .................. 429/191 |
| 5,916,475 | * 6/1999 | Michot et al. .................. 252/62.2 |

FOREIGN PATENT DOCUMENTS

| 0 576 225 | 12/1993 | (EP) . |
| 05 258607 | 10/1993 | (JP) . |
| 08 245828 | 9/1996 | (JP) . |
| WO 95 26056 | 9/1995 | (WO) . |
| WO 96 38872 | 12/1996 | (WO) . |

OTHER PUBLICATIONS

Pyati et al, "Voltammetry and conductivity of a poly-ether–pyridinium room temperature molten salt electrolyte and of its polymer electrolyte solutions in polydimethylsiloxane", Journal of the Electrochemical Society, vol. 143, No. 2, Feb. 1, 1996, Manchester, New Hampshire, pp. 401–405.

Watanabe et al, "Ionic conductivity of polymer electrolytes containing room temperature molten salts based on pyridinium halide and aluminum chloride", Electrochimica Acta, vol. 40, No. 13 14, Oct. 1, 1995.

* cited by examiner

Primary Examiner—Patrick D. Niland
(74) Attorney, Agent, or Firm—Nixon & Vanderhye

(57) ABSTRACT

An electrolyte comprises a composite of a polymer and a molten salt electrolyte immobilized within the polymer. The electrolyte is stable and ionically conducting at a temperature substantially equal to the melting point of the molten salt electrolyte. In this form, the electrolyte is suitable for use in electrochemical cells, supercapacitors or electrochromic windows and displays.

33 Claims, 1 Drawing Sheet

ELECTROLYTE

This invention relates to an electrolyte, in particular a polymer electrolyte suitable for batteries, supercapacitors, electrochromic windows and displays.

Conventional electrolytes for high power rechargeable batteries such as lithium ion batteries are mixtures of organic liquids. However, these liquids tend to be highly inflammable giving rise to concern about safety and also degrade with time, possibly due to adverse electrochemical reactions. Solid electrolytes have been proposed which are prepared by dissolving, or complexing, lithium salts within a polymer matrix to form a material which can be deposited as a thin film onto suitable electrode materials. In another example, a low melting temperature mix of lithium salts is dispersed within a polymer to give a film with enhanced conductivity. However, these electrolytes suffer from low ionic conductivities, whether they are plasticised polymers or immobilised liquids in polymers, because the ionic conductivity of the liquid fraction is low. This low ionic conductivity leads to poor performance at high currents. Such electrolytes are thermally stable at room temperature, but degrade easily if heated.

In accordance with a first aspect of the present invention, an electrolyte comprises a composite of a polymer and molten salt electrolyte immobilised within the polymer, wherein the composite is stable and ionically conductive at a temperature substantially equal to the melting point of the molten salt electrolyte.

The electrolyte of the present invention suitably has a solid form, remains stable at elevated temperatures, has good ionic conductivity and the liquid molten salt electrolyte does not leak from the composite.

The term "molten salt electrolyte" refers to any salt which conducts electricity when in a liquid or molten state. These salts are well known in the art.

Preferably, the molten salt electrolyte is a liquid at a temperature in the range from room temperature to 80° C. above room temperature.

This is convenient for many applications where batteries are used at room temperature, because no additional heat source is required before they can be used, but the benefits of the invention still apply with molten salts which operate at higher temperatures and an electrolyte using these molten salts has the capacity to be held for extended periods in a reserve state.

Preferably, the molten salt electrolyte incorporates a nitrogen containing cation, such as imidazolium or pyridinium.

Preferably, the molten salt electrolyte incorporates an anion comprising one of a sulphonate, sulphide, borate, phosphate or halide. For example alkyl sulphonate, optionally substituted with halide.

Examples of molten salts include 1-ethyl-3-methylimidazolium, and other dialkylsubstituted imidazolium or pyridinium salts.

As used herein the term "alkyl" means a straight or chain alkyl group, for example of from 1 to 20, more preferably from 1 to 6 carbon atoms in length. The term "halide" includes fluoride, chloride, iodide and bromide.

Preferably, the polymers include acrylate polymers; nitrile polymers; styrene polymers; polyalkenes, e.g. where the alkene includes from 2 to 8 carbon atoms and where the carbon atoms are optionally substituted, for example with hydroxy or C-6 alkoxy; polyethers, polyfluorinated compounds or copolymers thereof.

Specific examples of polymers which are suitable include polyethylene oxide, polymethylmethacrylate, polyacrylonitrile, polypropylene, polystyrene-polylbutadiene, polyethylene glycol, polyvinyldenefluoride, polyvlnyidene-hexafluoropropylene copolymers, or ethylene propylene diene monomer.

Preferably, the electrolyte further comprises a metal salt dissolved in the molten salt electrolyte.

This increases ionic conductivity.

Suitably, the metal salt comprises an alkali metal or alkaline earth metal salt, such as lithium, sodium, potassium, magnesium and calcium salts.

Preferably, the anions of the metal salt comprise borates, such as tetrafluoroborate; phosphates, such as hexafluorophosphate; imides; arsenates, such as hexafluoroarsenate; sulphonamides, such as trifluorosulphonamide; or sulphonates, such as trifluoromethane sulphonate.

Preferably, the electrolyte further comprises an organic solvent. The addition and solvation of organic species decreases the viscosity of the liquid molten salt electrolyte so that there is a further increase in ionic conductivity of the polymer electrolyte.

Examples of organic solvents include methanol, dimethylformamide, tetrahydrofuran, ethanol, propan-2-ol, propanone and N-methyl pyrollidinone.

The electrolyte alternatively comprises an organic plasticiser in order to reduce the viscosity of the molten salt electrolyte and increase the ionic conductivity of the polymer electrolyte.

Examples of organic plasticisers include, cyclic carbonates, cyclic and alkyl esters and ethers, such as propylene carbonate, diethyl carbonate, dimethylcarbonate and ethylene carbonate.

In accordance with a second aspect of the present invention, an electrochemical cell comprises a pair of electrodes; and an electrolyte according to the first aspect between the electrodes.

In accordance with a third aspect of the present invention, a supercapacitor comprises a pair of conducting electrodes; and an electrolyte according to the first aspect.

Preferably, the conducting electrodes comprise one of metal foil, high surface area carbons, or electrically conducting polymers.

In accordance with a fourth aspect of the present invention, an electrochromic window comprises first and second electrically conducting layers; first and second metal oxides coated on the respective layers; and an electrolyte according to any of claims 1 to 11 in contact with each of the metal oxide layers; wherein a change in potential difference between the conducting layers gives rise to a change in transparency of the metal oxide layers.

In accordance with a fifth aspect of the present invention, an electrochromic display comprises a plurality of display elements; each display element comprising first and second electrically conducting layers; and an electrolyte according to the first aspect between the first and second layers; wherein application of a potential difference between the conducting layers causes a change in transparency of the second electrically conducting layer.

Examples of an electrolyte according to the present invention and applications thereof will now be further described with reference to the accompanying drawings in which.

Figure 1:
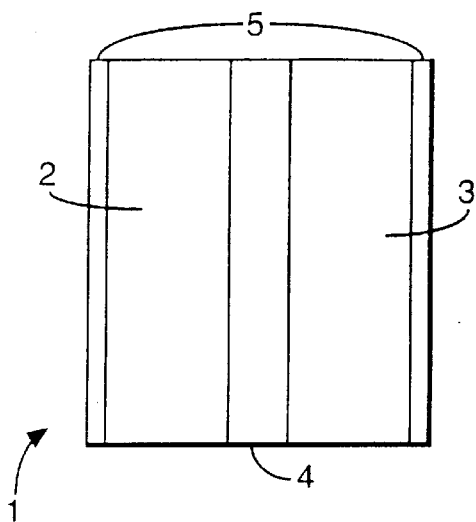
FIG. 1 illustrates an electrochemical cell incorporating an electrolyte according to the invention.

The main application of this technology is the use of the electrolyte in rechargeable and non-rechargeable batteries. An example of an electrochemical cell 1 is shown in FIG. 1 which comprises two electrodes 2,3 of different materials separated by a layer of polymer electrolyte 4 according to the invention. In use, the cell is connected to equipment for which it is providing power via current collectors 5, although the current collectors would not be necessary if a suitable self supporting and electrically conducting electrode material was used. During charge and discharge of the cell, ions migrate between the electrodes 2,3 where they undergo faradic (electrochemical) processes, i.e. they react to cause a chemical and physical change to the electrodes 2,3. In a rechargeable system the process is reversible, in primary batteries the process is irreversible. The ions migrate within the ioncially conductive phase of the polymer electrolyte and the electrolyte remains essentially unchanged. The invention allows a battery to be produced which can operate in the temperature range of 20° C. to 120° C. without loss of stability or conductivity of the electrolyte.

Figure 2:
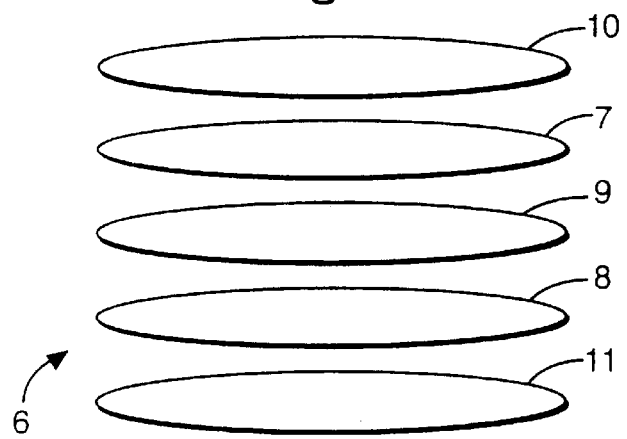
FIG. 2 illustrates a supercapacitor incorporating an electrolyte according to the invention; and, FIG. 3 illustrates an electrochromic window incorporating an electrolyte according to the invention.

Another application is in supercapacitors, or ultracapacitors, an example of which is shown in FIG. 2. The supercapacitor 6 comprises two electrodes 7,8 of the same material separated by an electrolyte 9 according to the invention. Current collectors 10,11 connect the supercapacitor to other components of equipment in use. The electrodes 7,8 may be made of metal foils, high surface area carbons or electrically conducting polymers. The highly conductive electrolyte of the present invention increases both the power output and charge storage of the supercapacitor 6 over that which can be achieved for a conventional capacitor.

During operation an electric double layer is formed at each surface of the electrodes which is in contract with the electrolyte, caused by the migration of ions under the influence of an electric field. The charge stored depends on the charge density on the surface of the electrodes. The stored electric energy is proportional to the square of the voltage. Molten salt polymer electrolytes have wide electrochemical windows allowing higher voltages to be achieved than in conventional supercapacitors. Molten salt polymer electrolytes also enable greater energy storage because they have a greater concentration of ionic species per unit volume than existing supercapacitor electrolytes, because the solvating liquid is itself ionic. As the electrical double layers develop during charging, ions become trapped at the electrodes, reducing the available ions in the electrolyte. Because of the ionic nature of the electrolyte of the present invention this negative effect is minimised, as the polymer electrolyte retains a high ionic conductivity.

Figure 3:
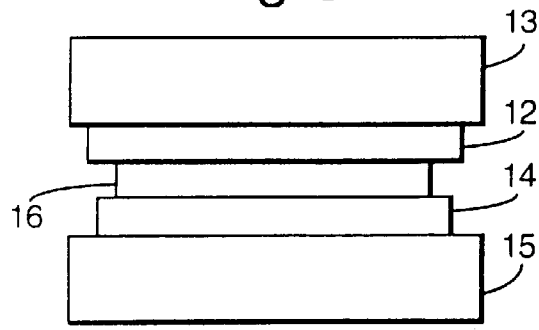

Another application is in electrochromic windows, an example of which is shown in FIG. 3. A layer of a metal oxide 12 e.g. tungsten trioxide is coated on an electrically conducting glass sheet 13, such as indium tin oxide (ITO) glass or polymeric film, such as polyaniline or polythiopene, and a different metal oxide 14 e.g. vanadium oxide is coated on another glass sheet or polymeric film 15 to form electrodes. The two electrodes are matched so that both are transparent, or opaque, concurrently. The electrodes are separated by an electrolyte 16 according to the invention incorporating a metal salt e.g. lithium. On charging, lithium or other small cations, are depleted from the electrolyte and migrate to one electrode. At the electrode these migrating ions undergo faradic processes and modify the structure of the electrode causing a colour change. The high ionic conductivity of the electrolyte according to the invention leads to faster response times. Hence the windows become darker and lighter more quickly because the ions are able to migrate faster. When switched off, the lithium comes out of the electrode and returns to the electrolyte, reversing the colour change. Another advantage of the electrolyte of the present invention applied as a film between the glass sheets or polymeric films is that there is no fluid pressure in the window as there would be if a liquid electrolyte was used. The enhanced thermal stability would also be good for fire safety and the like.

A development of this is an electrochromic display in which one of the electrodes comprises a glass sheet or polymeric film and the other electrode is e.g. a lithium film in a sponge type form. A film of polymer electrolyte according to the invention is provided between the glass sheet and the electrode. Colour change occurs by lithium depletion and enhancement. In order to produce an image on the display a plurality of individual windows are connected together in a grid and selectively darkened, so that each window is equivalent to a pixel of an image.

Experimental films of the electrolyte have been tested and some examples are described below. Composites of the invention may be prepared by mixing a molten salt electrolyte with a solution of a polymer in an organic solvent, and subsequently evaporating the solvent. The solution may be cast, for example onto a solid support such as a glass support, prior to the evaporation process, so as to form films of the composite. Other components of the composite, such as metal salts and plasticisers are suitably admixed with the molten salt electrolyte prior to mixing with the polymer solution. The ratio of liquid phase to polymer is generally 1:1, and preferably, no more than 70% liquid. The liquid phase is generally 100% molten salt electrolyte, unless an organic compound or metal salt is dissolved in the molten salt electrolyte. Where there is a metal salt, this would be dissolved into the liquid phase at a concentration in the range of 0.75M to 1.25M, typically a concentration of 1M or thereabouts. An organic compound would be up to 50% by weight of the liquid phase.

EXAMPLE 1

Polyethylene oxide was dissolved in acetonitrile to form a polymer solution. A molten salt, 1-ethyl-3-methylimidazolium (EMI) trifluoromethane sulphonate, was mixed into the polymer solution and the mixture was cast on a glass substrate. The acetonitrile was then removed by evaporation to give a flexible film having ionic conductivities between $10^{-4}$ S cm$^{-1}$ and $10^{-2}$ S cm$^{-1}$.

EXAMPLE 2

Polyethylene oxide was dissolved in acetonitrile to form a polymer solution. Lithium perchlorate was dissolved in a molten salt electrolyte, 1-ethyl-3-methylimidazolium (EMI) trifluoromethane sulphonate, and the resulting solution was mixed into the polymer solution. A film was then cast and the acetonitrile removed as in example 1.

EXAMPLE 3

A non-ionic organic plasticiser, ethylene carbonate and lithium tetrafluoroborate were dissolved in 1-ethyl-3-methylimidazolium (EMI) trifluoromethane sulphonate to give a clear liquid with a conductivity >$10^{-2}$ S cm$^{-1}$ at room temperature. This liquid was then mixed into a polymer dissolved in acetone. The mixture was cast and the acetone removed to leave a plastic electrolyte. The addition of an organic plasticiser increases the conductivity of the molten salt electrolyte, whilst the inert polymer immobilises the electrolyte making it safer and easier to handle.

The films produced may then be incorporated into devices for the applications described above. Those examples of the present invention, e.g. examples 1 and 2, which do not possess an organic plasticiser are thermally stable to temperatures in excess of 250° C. Examples of the present invention where there is an organic plasticiser are more tolerant of high temperatures, than conventional polymer electrolytes, and remain stable in excess of 110° C. with improved conductivity. This compares well with conventional rechargeable batteries which tend to be unstable at around 50° C.

What is claimed is:

1. An electrolyte comprising a composite of a non-conducting polymer and an organic molten salt electrolyte immobilized within the polymer, wherein the polymer is an acrylate polymer, nitrile polymer, styrene polymer, polyalkene, polyether, polyfluorinated compound or copolymers thereof; the molten salt electrolyte contains a cation of imidazolium and an anion of sulphonate, sulphide, borate, phosphate or halide; and wherein the composite is stable and ionically conducting at a temperature substantially equal to the melting point of the molten salt electrolyte.

2. An electrolyte according to claim 1, further comprising a metal salt dissolved in the molten salt electrolyte.

3. An electrolyte according to claim 2, wherein the metal salt comprises an alkali metal or alkaline earth metal salt.

4. An electrolyte according to claim 2, wherein the metal salt comprises a lithium salt.

5. An electrolyte according to claim 3, wherein the metal salt comprises a lithium salt.

6. An electrolyte according to claim 2, wherein the anions of the metal salt comprise borates; phosphates; imides; arsenates or sulphonates.

7. An electrolyte according to claim 1, wherein the molten salt electrolyte incorporates an anion comprising one of a sulphonate, sulphide, or halide.

8. An electrolyte according to claim 1, wherein the molten salt electrolyte is a liquid at room temperature.

9. An electrolyte according to claim 1, wherein the molten salt electrolyte has a melting point within 80° C. above room temperature.

10. An electrolyte according to claim 1, further comprising an organic solvent.

11. A battery comprising a pair of electrodes; and an electrolyte according to claim 1.

12. A supercapacitor comprising a pair of conducting electrodes and an electrolyte according to claim 1.

13. A supercapacitor according to claim 12, wherein the conducting electrodes comprise one of a metal foil, high surface area carbons, or electrically conducting polymers.

14. An electrochromic window comprising first and second electrically conducting layers, first and second metal oxides coated on the respective conducting layers and an electrolyte according to claim 1 in contact with each of the metal oxide layers, wherein a change in potential difference between the conducting layers gives rise of a change in transparency of the metal oxide layers.

15. An electrodynamic display comprising first and second electrically conducting layers, and an electrolyte according to claim 1 between the first and second layers, wherein the application of a potential difference between the electrically conducting layers causes a change in transparency of the second electrically conducting layer.

16. An electrolyte comprising a composite of a non-conducting polymer and an organic molten salt electrolyte immobilized within the polymer, wherein the polymer is an acrylate polymer, nitrile polymer, styrene polymer, polyalkene, polyether, polyfluorinated compound or copolymers thereof; the molten salt electrolyte consists essentially of a cation of imidazolium, an anion of sulphonate, sulphide, borate, phosphate or halide and a metal salt dissolved in the molten salt electrolyte; and wherein the composite is stable and ionically conducting at a temperature substantially equal to the melting point of the molten salt electrolyte.

17. An electrolyte according to claim 16, wherein the metal salt is an alkali metal or alkaline earth metal salt.

18. An electrolyte according to claim 16, wherein the metal salt is a lithium salt.

19. An electrolyte according to claim 17, wherein the metal salt is a lithium salt.

20. An electrolyte according to claim 16, wherein the anion of the metal salt is a borate; phosphate; imide; arsenate or sulphonate.

21. An electrolyte according to claim 16, wherein the molten salt electrolyte incorporates an anion containing a sulphonate, sulphide, or halide.

22. An electrolyte according to claim 16, wherein the molten salt electrolyte is a liquid at room temperature.

23. An electrolyte according to claim 16, wherein the molten salt electrolyte has a melting point within 80° C. above room temperature.

24. An electrolyte according to claim 16, further comprising an organic solvent.

25. A battery comprising a pair of electrodes and an electrolyte according to claim 16.

26. A supercapacitor comprising a pair of conducting electrodes and an electrolyte according to claim 16.

27. A supercapacitor according to claim 26, wherein the conducting electrodes are a metal foil, high surface area carbons, or electrically conducting polymers.

28. An electrochromic window comprising first and second electrically conducting layers, first and second metal oxides coated on the respective conducting layers and an electrolyte according to claim 16 in contact with each of the metal oxide layers, wherein a change in potential difference between the conducting layers gives rise of a change in transparency of the metal oxide layers.

29. An electrodynamic display comprising first and second electrically conducting layers, and an electrolyte according to claim 16 between the first and second layers, wherein the application of a potential difference between the electrically conducting layers causes a change in transparency of the second electrically conducting layer.

30. An electrolyte according to claim 1, wherein the molten salt incorporates an anion of alkyl sulphonate or halo-alkyl sulphonate.

31. An electrolyte according to claim 30, wherein the molten salt incorporates an anion of trifluoromethane sulphonate.

32. An electrolyte according to claim 16, wherein the molten salt incorporates an anion of alkyl sulphonate or halo-alkyl sulphonate.

33. An electrolyte according to claim 32, wherein the molten salt incorporates an anion of trifluoromethane sulphonate.

* * * * *